(12) United States Patent
Fong et al.

(10) Patent No.: US 8,620,934 B2
(45) Date of Patent: Dec. 31, 2013

(54) SYSTEMS AND METHODS FOR SELECTING DATA ELEMENTS, SUCH AS POPULATION MEMBERS, FROM A DATA SOURCE

(75) Inventors: Tanming Fong, Seattle, WA (US); Chris Sorensen, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 276 days.

(21) Appl. No.: 13/101,895

(22) Filed: May 5, 2011

(65) Prior Publication Data
US 2011/0276920 A1 Nov. 10, 2011

Related U.S. Application Data

(60) Provisional application No. 61/331,593, filed on May 5, 2010.

(51) Int. Cl.
*G06F 7/00* (2006.01)
*G06F 17/30* (2006.01)

(52) U.S. Cl.
USPC .......................................... 707/754; 707/706

(58) Field of Classification Search
USPC ................................................ 707/706, 754
See application file for complete search history.

(56) References Cited

U.S. PATENT DOCUMENTS

| | | | | |
|---|---|---|---|---|
| 7,398,269 | B2 * | 7/2008 | Shanahan et al. | 707/754 |
| 8,069,151 | B1 * | 11/2011 | Crafford et al. | 707/674 |
| 2002/0083039 | A1 * | 6/2002 | Ferrari et al. | 707/1 |
| 2003/0014414 | A1 * | 1/2003 | Newman | 707/10 |
| 2003/0200220 | A1 * | 10/2003 | Hu et al. | 707/100 |
| 2003/0214660 | A1 * | 11/2003 | Plass et al. | 358/1.9 |
| 2004/0059802 | A1 * | 3/2004 | Jacquemot et al. | 709/220 |
| 2009/0083224 | A1 * | 3/2009 | Dettinger et al. | 707/3 |

* cited by examiner

*Primary Examiner* — Charles Lu
(74) *Attorney, Agent, or Firm* — Perkins Coie LLP

(57) ABSTRACT

Systems and methods for selecting data elements, such as population members, from a data source include translating the data source into a reverse schema. The reverse schema includes one or more data objects, each data object having a reverse access identifier and at least one unique identifier from the data source corresponding to the reverse access identifier. In some embodiments, access to data elements is provided using the reverse schema translation. A user may select a filter represented by a reverse access identifier in order to exclude those data elements associated with that reverse access identifier. In response, information associated with non-excluded data elements, such as population size, is provided for display.

20 Claims, 14 Drawing Sheets

FIG. 5E

570

575

Preconfigured Output Groups

- Mailing (contact info only)
- Event (detailed)
- Recognition
- Counts only (just keep the criteria, no output files)
- All fields

Output Option

- Individual
- Family Group

Specific Output Fields

- Bio

580

- Advance ID# (required)
- Household ID#
- Entity Type (primary)
- Status
- First Name
- Middle Name
- Last Name
- Sort Name
- Report Name
- Preferred Mail Name
- Preferred Joint Mail Name
- Recognition Name Informal
- Recognition Name Formal
- Preferred Single Salutation
- Preferred Joint Salutation
- Specialized Salutation by Code
- Suffixes
- Prefix Next

SYSTEMS AND METHODS FOR SELECTING DATA ELEMENTS, SUCH AS POPULATION MEMBERS, FROM A DATA SOURCE

CROSS-REFERENCE TO RELATED APPLICATION(S)

This application claims priority to U.S. Provisional Patent Application No. 61/331,593, entitled Systems and Methods for Choosing Population Members, filed May 5, 2010, which is hereby incorporated by reference in its entirety.

TECHNICAL FIELD

The disclosed technology relates generally to choosing data elements from a data source. More particularly, the disclosed technology relates to managing data in a way that allows for efficient selection and/or display of data elements.

BACKGROUND

Historically, when selecting data from a data source, such as a database, a user has been required to have a certain amount of expertise in a data selection language, such as SQL. For example, to extract data from Microsoft SQL Server, a user should have familiarity with T-SQL; to extract data from Oracle's database system, a user should be familiar with basic SQL and PL/SQL; and to extract data from an Excel table, a user should be familiar with Excel functions. Even to extract data from a simple text file, a user should be familiar with a text parsing language, such as PERL.

As a result, previous database access models require a user to manually enter SQL or other data selection language statements. Alternatively or additionally, such database access models display available database tables and allow users to join tables using primary keys, in addition to selecting attributes associated with those primary keys.

Accordingly, methods and systems for selecting data elements from a data source without requiring knowledge of a data selection language and/or familiarity with primary keys are desired. Such methods and systems would allow users to select data from data sources in a simpler manner, facilitating greater accessibility to databases and more widespread use of database applications.

BRIEF DESCRIPTION OF THE DRAWINGS

FIG. 1 is a block diagram of a network environment in which aspects of the technology may operate.

FIG. 2 is a block diagram of a client device in which aspects of the technology may operate.

FIG. 3 is a block diagram of a server device in which aspects of the technology may operate.

FIG. 4 is a flow chart of a method for accepting user input and displaying selected population members.

FIG. 5A is a screenshot of a basic filtering selection screen used to filter members from a master population.

FIG. 5B is a screenshot of an alternative search filtering selection screen used to filter members from the master population.

FIG. 5C is a screenshot of a map filtering selection screen used to filter members from the master population.

FIG. 5D is a screenshot of an advanced filtering selection screen used to filter members from the master population.

FIG. 5E is a screenshot of a reporting screen used to select report criteria.

FIG. 6 is a flow chart of a method for translating one or more data source(s) into a reverse schema.

FIG. 7 is a block diagram of a reverse schema translation.

FIG. 8 is a flow chart of a method for applying filters.

FIG. 9 is a block diagram illustrating the use of filters.

FIG. 10 is a flow chart illustrating a method for removing a filter.

DETAILED DESCRIPTION

Methods and systems for selecting data elements, such as members of a population, from a data source are described herein. Population members include individuals and/or entities having demographic information of interest to the selector. For example, in some embodiments, population members include alumni, students, employees, donors, and/or other individuals and/or entities associated with an organization, such as a university.

In some embodiments, the techniques described herein include methods and systems for translating one or more data sources into a reverse schema. Data sources may include databases, spreadsheets, text files, and/or other data sources. A plurality of unique identifiers associated with the data source(s) are received. For example, in some embodiments, the unique identifiers include primary keys associated with a database. The unique identifiers are used to translate the data source into a reverse schema. The reverse schema includes one or more data objects, each data object having a reverse access identifier and a set of unique identifiers corresponding to the reverse access identifier. For example, a data object may correspond to "faculty," and the set of unique identifiers may correspond to identifiers associated with individuals designated as faculty members.

In some embodiments, the techniques described herein further include methods and systems for providing access to data elements, such as population members, using the reverse schema translation. A user may select a filter represented by a reverse access identifier. For example, the user may select a "faculty" filter to exclude from a current population those individuals designated as faculty members. In response to filter selection, a working list of unique identifiers is generated; the working list includes the plurality of unique identifiers associated with the data source. Each unique identifier in the working list not associated with the selected reverse access identifier (e.g., each individual not designated as a faculty member) is flagged. Each unique identifier in a master list of unique identifiers that is not flagged in the working list (e.g., each individual designated as a faculty member) is then blacklisted. Information associated with the non-blacklisted unique identifiers, such as the size of the population (e.g., the non-faculty member population in the current example), is provided for display.

The techniques described herein do not require users to have knowledge of a data selection language, such as SQL, and/or familiarity with primary keys. Among other benefits, the techniques described herein allow users to select data from data sources in a simpler manner, facilitating greater accessibility to databases and more widespread use of database applications.

The present technology will now be described more fully with reference to the accompanying drawings, which show exemplary embodiments of the technology. Among other embodiments, the present technology may be embodied as methods, systems, and/or devices for selecting data elements, such as population members, from a data source. Accordingly, the present technology may take the form of entirely hardware embodiments, entirely software embodiments, and/ or embodiments combining software and hardware aspects. The following detailed description is, therefore, not intended to be limited to the embodiments set forth herein; rather, the technology may be embodied in many different forms in accordance with the spirit and scope of the disclosed technology.

1. Suitable Computing Environment

Figure 1:
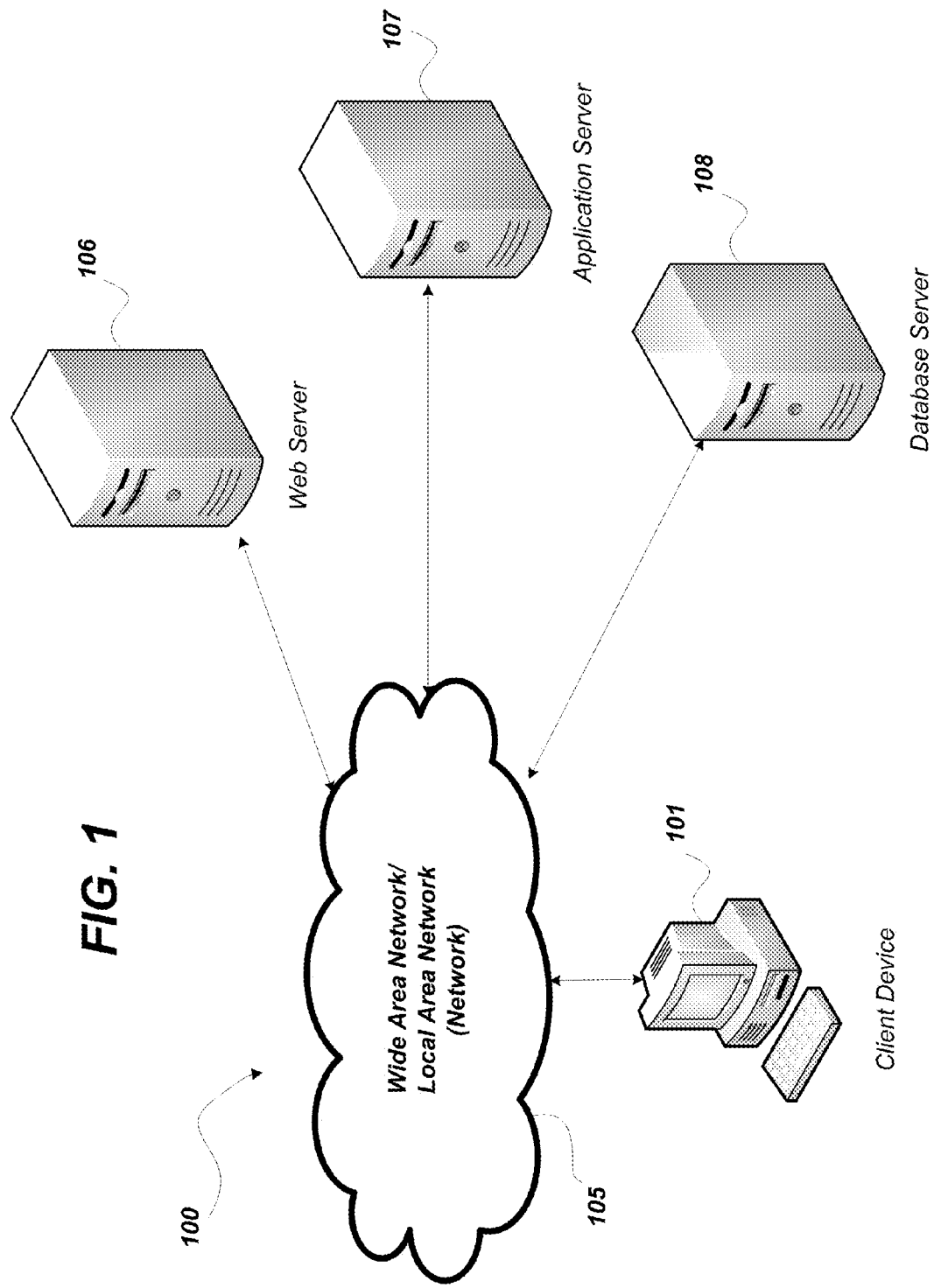

FIG. 1 depicts a suitable network environment in which aspects of the described technology may operate. Variations in the arrangement and type of the components depicted in FIG. 1 may be made without departing from the spirit and scope of the technology described herein. As shown, system 100 of FIG. 1 comprises a network 105 that enables communication between client and server devices. The network 105 may be a wired or wireless network, and may comprise the Internet, one or more local area networks (LANs), and/or one or more wide area networks (WANs). System 100 also includes a general purpose client device 101, a web server 106, an application server 107, and a database server 108.

In some embodiments, client device 101 sends a web page request over the network 105 to the web server 106. The web page request includes a request to select population data from a data source, such as a database, maintained on database server 108. The web server 106 receives the web page request from the client device 101 and sends an application data request over the network 105 to the application server 107. The application data request includes a request for data contents associated with the web page request. The application server 107 receives the application data request from the web server 106 and sends a data request over the network 105 to the database server 108. The database server 108 receives and responds to the data request with the appropriate data over network 105 to application server 107. Application server 107 receives the appropriate data, completes the processing of the application data request by incorporating the data received from web server 106, and sends a completed application data response over network 105 to web server 106. Web server 106 receives the completed application data response from application server 107, formulates a web page in response to the web page request by incorporating the completed application data response from application server 107, and sends the web page over network 105 to client device 101.

Client device 101 may include any type of computing device capable of sending and receiving information over a network, such as network 105. Client devices 101 may include personal computers, multiprocessor systems, microprocessor-based or programmable consumer electronics, network PCs, and/or other computer systems. Client devices 101 may also include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and/or other devices.

Figure 2:
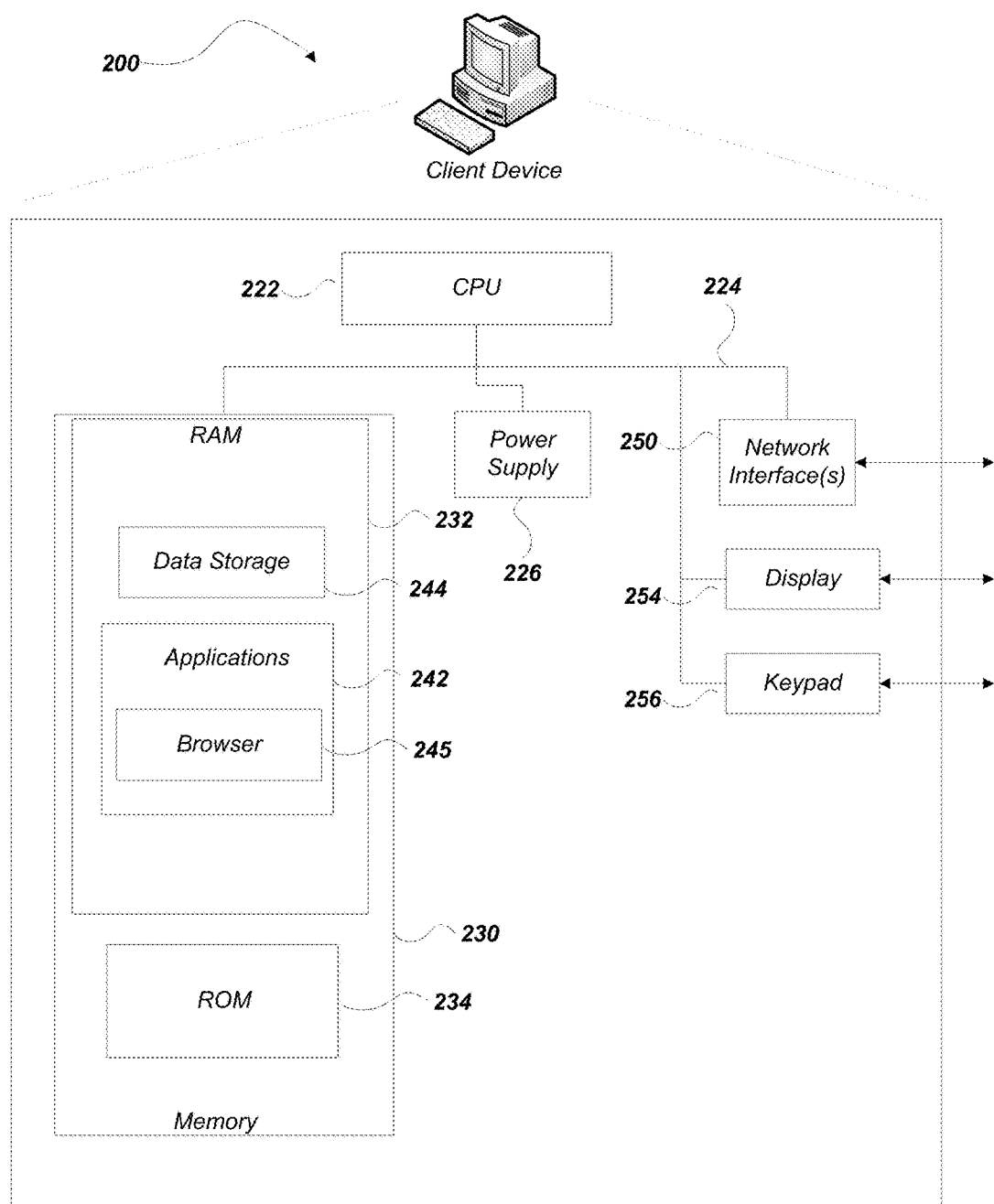

In some embodiments, client device 101 may take the form of the client device 200 depicted in FIG. 2. As shown in FIG. 2, client device 200 includes a central processing unit (CPU) 222 in communication with a mass memory 230 via a bus 224. Mass memory 230 includes a RAM 232, a ROM 234, and/or other storage means. In some embodiments, mass memory 230 comprises physical and/or non-transitory computer-readable storage media configured to store computer-readable instructions, data structures, program modules, and/or other data for performing the functions described herein. Alternatively, computer implemented instructions, data structures, screen displays, and other data related to the technology may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

Mass memory 230 further includes data storage 244 and one or more applications 242. Data storage 244 may be utilized by client device 200 to store, among other things, applications 242 and/or other data. For example, data storage 244 may be used to store search data, user preferences, address books, and/or other information. A portion of the information may also be stored on a disk drive or other storage medium (not shown) within client device 200.

Applications 242 may include computer-executable instructions which, when executed by client device 200, execute application programs such as calendars, search programs, email clients, instant messaging (IM) applications, voice over Internet protocol (VOIP) applications, database programs, word processing programs, security applications, spreadsheet programs, games, search programs, and so forth. For example, a browser application 245 is depicted in FIG. 2.

Browser 245 may comprise any application configured to receive and display graphics, text, multimedia, and/or other information, employing virtually any web-based language. In some embodiments, the browser application is enabled to employ JavaScript, Standard Generalized Markup Language (SMGL), HyperText Markup Language (HTML), eXtensible Markup Language (XML), and/or other web-based languages, to send web requests and display web pages. However, any of a variety of other web-based languages may be employed. In some embodiments, browser 245 is configured to enable access to a population chooser application, such as via web server 106, application server 107, and/or database server 108 of FIG. 1.

Client device 200 also includes a power supply 226, a network interface 250, a display 254, and a keypad 256. Network interface 250 includes circuitry for coupling client device 200 to one or more networks, and is constructed for use with one or more communication protocols and technologies.

Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. Keypad 256 may comprise any input device arranged to receive input from a user. For example, keypad 256 may include a keyboard.

In other embodiments, client device 200 may include more or fewer components than those shown in FIG. 2.

Returning to FIG. 1, network 105 is configured to couple web server 106, application server 107, database server 108, and their components with other computing devices, including client device 101. Network 105 is enabled to employ any form of computer-readable media for communicating information from one electronic device to another.

Application server 107 includes any computing device capable of connecting to network 105 to enable data searching, filtering, sorting, and/or other data management operations. In some embodiments, application server 107 also provides reverse schema formation capability and/or other functions associated with the technology described herein. Devices that may operate as application server 107 include personal computers, desktop computers, multiprocessor systems, microprocessor-based or programmable consumer electronics, network PCs, servers, and the like.

Although FIG. 1 illustrates web server 106, application server 107, and database server 108 each as a single computing device, the described technology may be practiced in a variety of other configurations. For example, one or more functions of web server 106, application server 107, and/or database server 108 may be distributed across one or more distinct computing devices. For example, generating web pages, providing search results, forming reverse schema, processing data filtering requests, managing data structures, managing data storage, and/or other functions may be performed by a plurality of computing devices, without departing from the spirit or scope of the present technology. Alternatively, web server 106, application server 107, and/or database server 108 may be combined into one computing device without departing from the spirit or scope of the present technology. The environment depicted in FIG. 1 is merely an exemplary environment in which embodiments of the present technology may be practiced.

Figure 3:
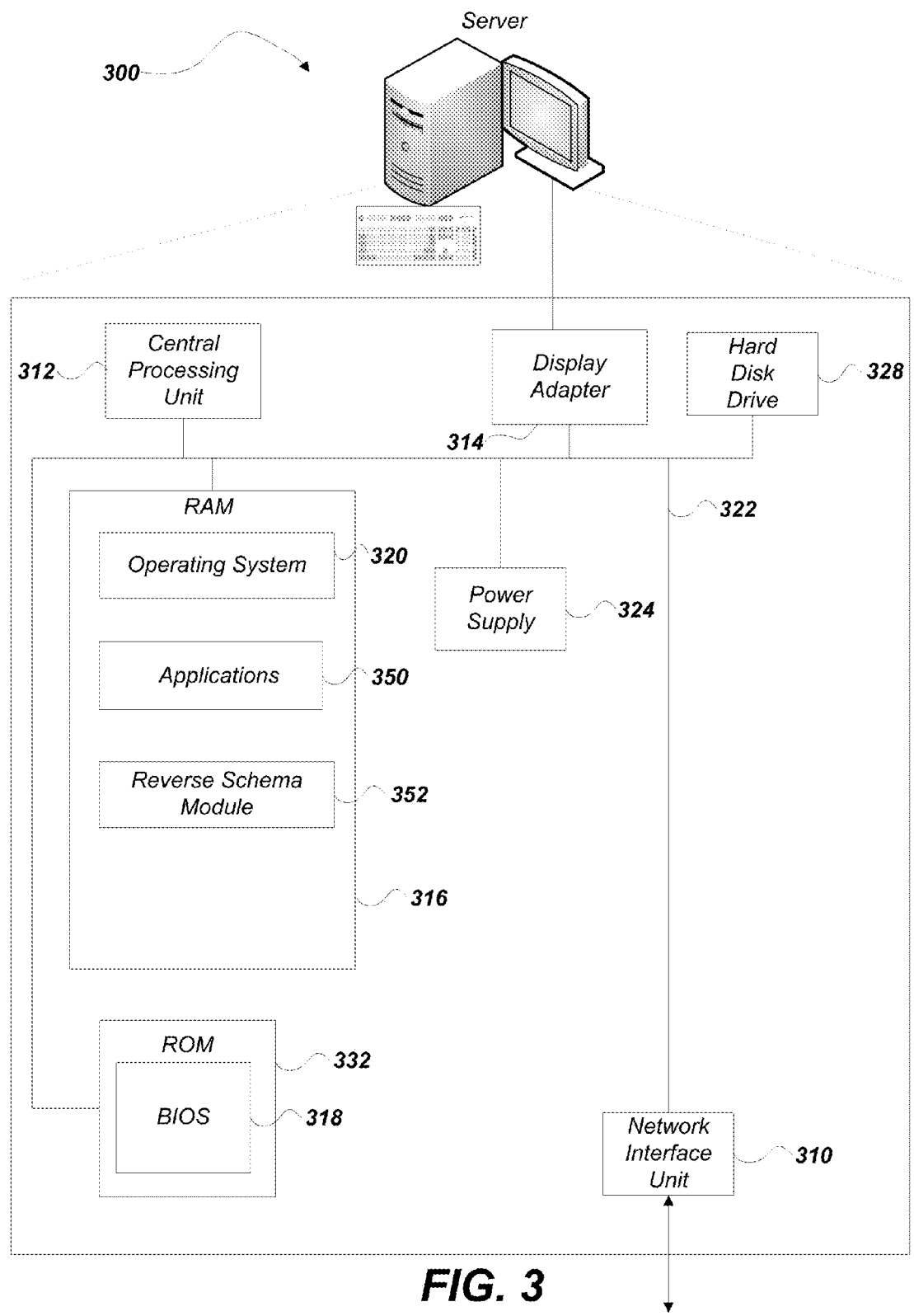

In some embodiments, web server 106, application server 107, and/or database server 108 take the form of server 300 depicted in FIG. 3. Server 300 includes a central processing unit (CPU) 312, display adapter 314, and a mass memory, all in communication with each other via bus 322. The mass memory generally includes RAM 316, ROM 332, and one or more permanent mass storage devices, such as hard disk drive 328, a tape drive, an optical drive, and/or a floppy disk drive. The mass memory stores operating system 320 for controlling the operation of server device 300, applications 350, and reverse schema module 352. Any general-purpose operating system may be employed. Basic input/output system ("BIOS") 318 is also provided for controlling the low-level operation of server 300. Server 300 also includes power supply 324. As illustrated in FIG. 3, server device 300 also has a network interface unit 310, which is configured for communication with the Internet and/or other communications network via various communication protocols, including TCP/IP.

In some embodiments, the mass memory comprises physical and/or non-transitory computer-readable storage media. Such computer-readable storage media may include volatile, nonvolatile, removable, and/or non-removable media implemented in any method or technology for storage of information, such as computer-readable instructions, data structures, program modules, and/or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, cloud storage, and/or any other medium which can be used to store the desired information and which can be accessed by a computing device. Alternatively, computer implemented instructions, data structures, screen displays, and other data related to the technology may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

The mass memory also stores program code and data. For example, one or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, email servers, account management and so forth. In some embodiments, the application programs include a reverse schema module 352, which may be included as an application program within applications 350 or as a separate application.

Reverse schema module 352 is configured to receive data source(s), translate the data source(s) into a reverse schema, accept population chooser filters, and provide population members to client devices. In some embodiments, reverse schema module 352 resides on a single server. In other embodiments, reverse schema module 352 is distributed across multiple computing devices. Reverse schema module 352 may employ a process substantially similar to that described herein.

In other embodiments, server 300 may include more or fewer components than those depicted in FIG. 3.

Figure 4:
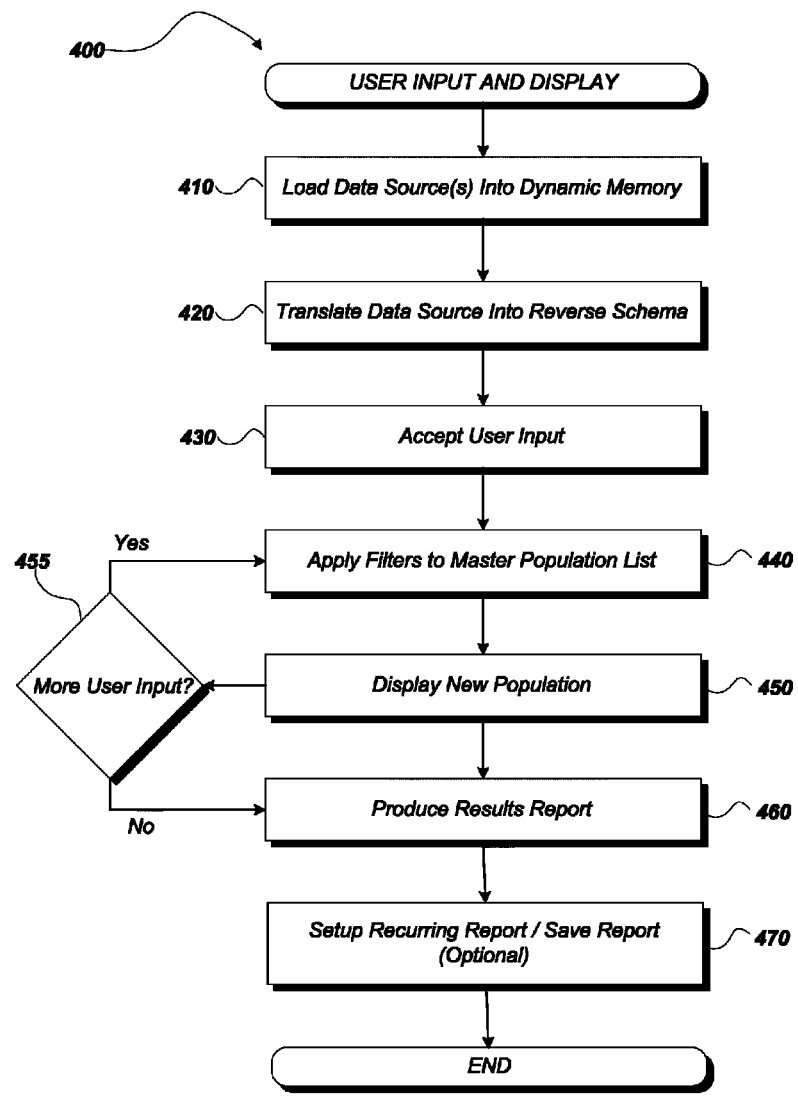

2. Methods and Systems for Choosing Population Members
   a. Filtering Population Members FIG. 4 is a flow chart of an exemplary method 400 for accepting user input and displaying selected population members to a user. Throughout this description, reference to a client may be substituted for any reference to a user. It is not relevant to the present technology whether filter data comes from a human user of a web page or computer application, or whether the filter data is automatically provided by a computer device, or other such automatic provision. Thus, the terms user and client are used interchangeably.

First, at block 410, one or more data sources are loaded into dynamic memory on a server. Loading the data source into dynamic memory allows for faster access to the data and a better user experience. Multiple data sources may be included from multiple locations. For example, potential data sources may include, but are not limited to, a database (including a wide variety of commercially available databases, such as Microsoft SQL Server, Access, Oracle database, mySQL, etc.), a spreadsheet (including a wide variety of commercially available spreadsheet types, such as Microsoft Excel, OpenOffice, etc.), a text file, and/or other data sources.

Figure 6:
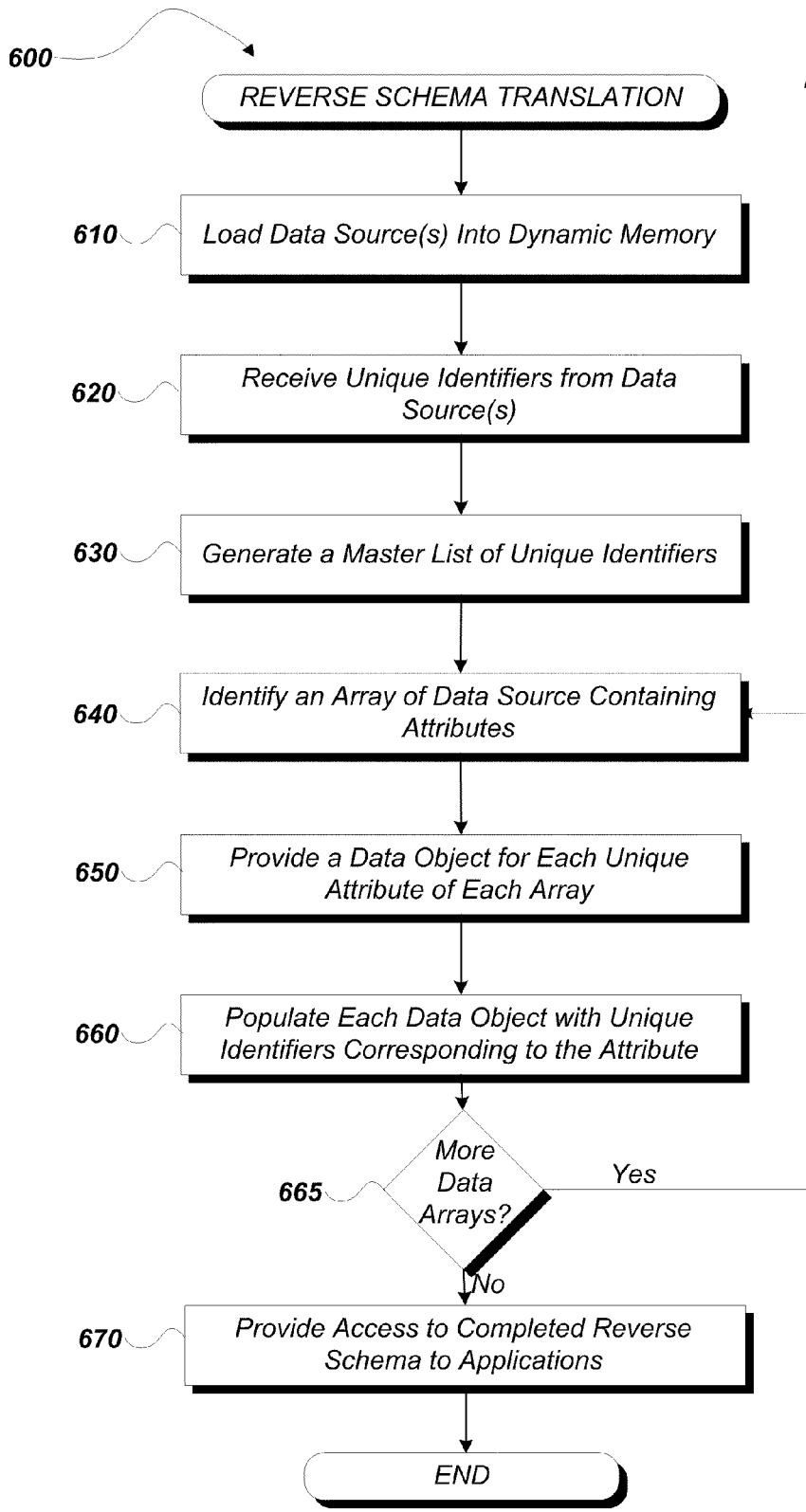

Next, at block 420, the data source(s) loaded into dynamic memory are translated into a reverse schema, as described herein in reference to FIG. 6. As part of the reverse schema, a master list, is generated. As described in additional detail herein, the master list includes unique identifier from the data source(s). The reverse schema is used as a basis for selecting and filtering population data, as described more fully below. As discussed in accordance with block 410, the reverse schema may be accessed while loaded into dynamic memory for faster data processing and a higher quality user experience. However, it is not necessary for the entire reverse schema to remain in dynamic memory during the entire duration of a user's interaction with the system. In some embodiments, data structures of the reverse schema are saved in locations other than dynamic memory and loaded into dynamic memory when actions are to be performed involving the particular data structures. For example, a data structure may be stored in a file and placed into cloud computing or more permanent storage medium for later retrieval, while other data structures may remain in dynamic memory to be used by the system.

Next, at block 430, user input is accepted for selecting and filtering population data. As described more fully herein, a user is presented with a current population size and a selection menu of attributes by which the master list and current population list may be filtered and refined. The user selects one or more attributes by which to filter the master and current population lists.

At block 440, the user's selected filter input is accepted and used as a basis for applying a flag to the master list. The current population list is refined to include members that are not excluded by the user's selected filter input.

Next, at block 450, the number of population members in the refined current population list is displayed to the user.

At decision block 455, the system determines whether the user has submitted additional input. For example, the user may select another attribute by which to filter the refined master list and current population list. Alternatively, the user may change or remove previously selected filter criteria. If the user chooses to change or remove previously selected filter criteria, or chooses to select another attribute by which to filter the master list, the method returns to block 440. If, however, the user does not submit additional input (e.g., chooses not to change or remove previously selected filter criteria or chooses not to select another attribute by which to filter the master list), the method proceeds to block 460.

At block 460, the members of the current population list are displayed to the user. In some embodiments, the user may select which attributes of the members of the current population list are to be displayed. In some embodiments, a report is generated that organizes the current population members and the selected attributes in a manner that is visually appealing, such as in a bar graph or table format.

Next, at block 470, the final criteria used in refining the master population list is optionally saved for future use by the user. The user may subsequently revisit the report, which will be run at that time on updated data source(s). In some embodiments, the report generated in block 460 is generated automatically on updated data source(s) and delivered to the user in a predetermined manner, such as by email or other delivery method.

FIGS. 5A-5D are screenshots of exemplary user interactions with a master population list when selecting filters and refining the master population list. The images contained in FIGS. 5A-5D are intended to be exemplary in nature; the disclosed technology is not limited to the layout presented in these Figures. Moreover, the disclosed technology is not limited to web pages offered via the Internet, but may also be practiced using software loaded onto a client device, such as that illustrated by the client device 200 of FIG. 2, or other methods of user interaction.

Figure 5A:
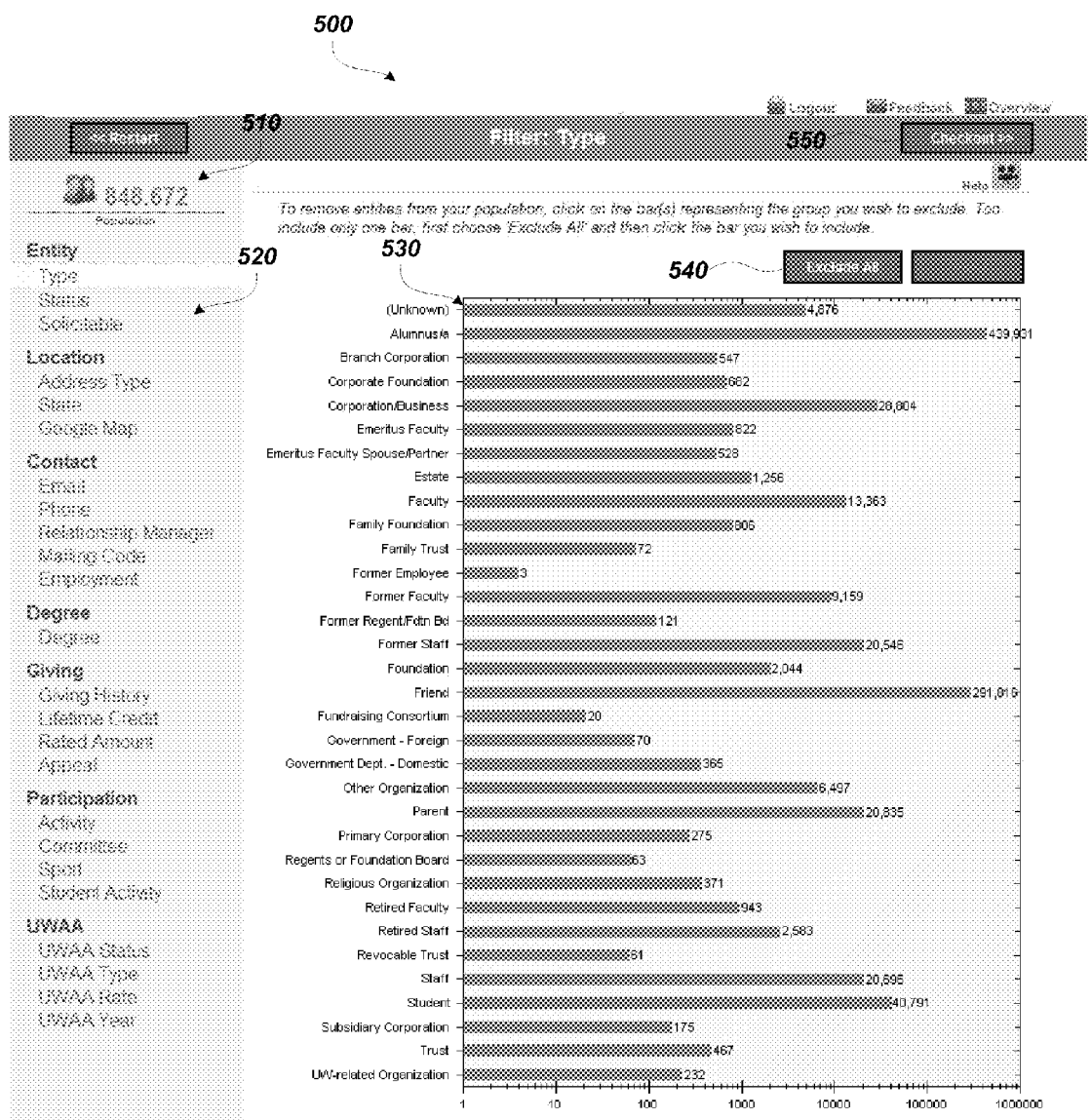

FIG. 5A is a screenshot of a basic filtering selection screen 500 used to filter members from a master population. The basic filtering selection screen 500 includes a current population size 510, an attribute selection menu 520, a filter application 530, an exclude all button 540, and a checkout button 550.

As described in accordance with FIG. 4 above, the user selects filtering criteria to be used in narrowing the master population list size to a desired population subset. Accordingly, in some embodiments, as the user selects filtering criteria, the current population size 510 is updated to reflect the number of members remaining in the population after the filters have been selected. The updates performed by the system and reflected on the basic filtering selection screen 500 may be performed using a wide variety of protocols, including Internet protocols, such as Flash programming, AJAX, TCP, or UDP.

Attribute selection menu 520 includes a list of attribute categories that may be used to filter the population. For example, attribute categories may include entity type, address, contact information, giving history, activity, and/or other categories. The list of attribute categories displayed in FIG. 5A is exemplary; in other embodiments, the list may have more, fewer, and/or other items than those illustrated in FIG. 5A. When the user selects an item from selection menu 520, corresponding item attributes are displayed in filter application 530.

Filter application 530 displays attributes associated with an item of selection menu 520. In some embodiments, for each attribute displayed in filter application 530, the number of members from the current population size 510 associated with the particular attribute is displayed. For example, FIG. 5A indicates that 439,931 population members have an entity type of "alumnus/a," while 13,363 population members have an entity type of "faculty." In some embodiments, because the number of members of the current population size 510 associated with a particular attribute may vary widely from attribute to attribute, filter application 530 may display the number of members of the current population size 510 associated with a particular attribute using a logarithmic or other scale.

The user selects one or more attributes for filtering the population from the attribute list presented in filter application 530. For example, if the user is interested in excluding faculty members from the current population, the user may select the "faculty" attribute. Attributes may be selected in a variety of manners, such as by selecting a graph bar, icon, or other graphic and/or text associated with the attribute. For example, in FIG. 5A, the user may select the faculty attribute by selecting the graph bar associated with the faculty label.

Alternatively, the user may choose to select the exclude all button 540. When the exclude all button 540 is selected, all attributes in the list presented in filter application 530 are selected for exclusion, and members of the current population represented by current population size 510 associated with an attribute displayed in filter application 530 are removed from current population size 510.

Upon selecting the one or more attributes for filtering, or selecting the exclude all button 540, the current population size 510 is updated to reflect the number of population members remaining in the current population after the appropriate filters are applied.

After the user has selected one or more attributes for filtering, or the user has pushed the exclude all button 540, the user may unselect an attribute. When an attribute is unselected, the filter previously applied to the master population list is removed, and the current population size 510 is updated to reflect the members that are reinserted in the current population due to removal of the filter. In some embodiments, attributes may be selected and unselected multiple times in various orders; the order and repetitiveness of the user's selection and deselection of attributes is not relevant to the present technology.

When the user is satisfied with the selection or exclusion of attributes and the resulting current population size 510, the user selects the checkout button 550 to receive a report of attributes associated with the remaining members in the current population. Such report is described in additional detail herein, in reference to FIG. 5E.

Figure 5B:

FIG. 5B is a screenshot of an alternative search filter screen 502 used to filter members from the master population. The search filter screen 502 includes a current population size 512, a selection menu 522, a filter application 532, and a checkout button 552. The filter application 532 includes a search box 546, a search button 548, an include selection 542, and an exclude selection 544.

Similar to the embodiments depicted in FIG. 5A, as a user selects filtering criteria, the current population size 512 is updated to reflect the number of members remaining in the current population after filtering criteria have been selected.

Also similar to the embodiments depicted in FIG. 5A, attribute selection menu 522 includes a list of attribute categories. When the user selects an item from selection menu 522 corresponding item attributes are displayed in filter application 532.

However, if the list of attributes displayed in filter application 532 is quite large, it may be unwieldy for the user to find desired attributes to include or exclude. For example, a list of attributes that included all activities in which university alumni, students, and/or employees may participate would be cumbersome for a user to navigate. Accordingly, in some embodiments, a search function is provided for narrowing the attributes displayed in filter application 532. In FIG. 5B, for example, a user has entered "ab" in a search box 546. When the user selects search button 548, in the depicted embodiment, all attributes containing "ab" are displayed in filter application 532. In other embodiments, the search for "ab" could result in displaying only attributes that begin with "ab," contain the whole word "ab," conclude with "ab," and/or otherwise include "ab."

In the depicted embodiment, each attribute displayed in filter application 532 is associated with both an include selection icon 542 and an exclude selection icon 544. The user may select the include selection icon 542 associated with an attribute to include population members associated with that attribute, or select the exclude selection icon 544 to exclude population members associated with that attribute. Similar to the embodiments illustrated in FIG. 5A, upon the inclusion or exclusion of attributes, the current population size 512 is updated to reflect the size of the current population due to inclusion or exclusion of members associated with included or excluded attributes.

When the user is satisfied with the selection or exclusion of attributes and the resulting current population size 512, the user selects the checkout button 552 to receive a report of attributes associated with the current population members, as described herein in reference to FIG. 5E.

Figure 5C:
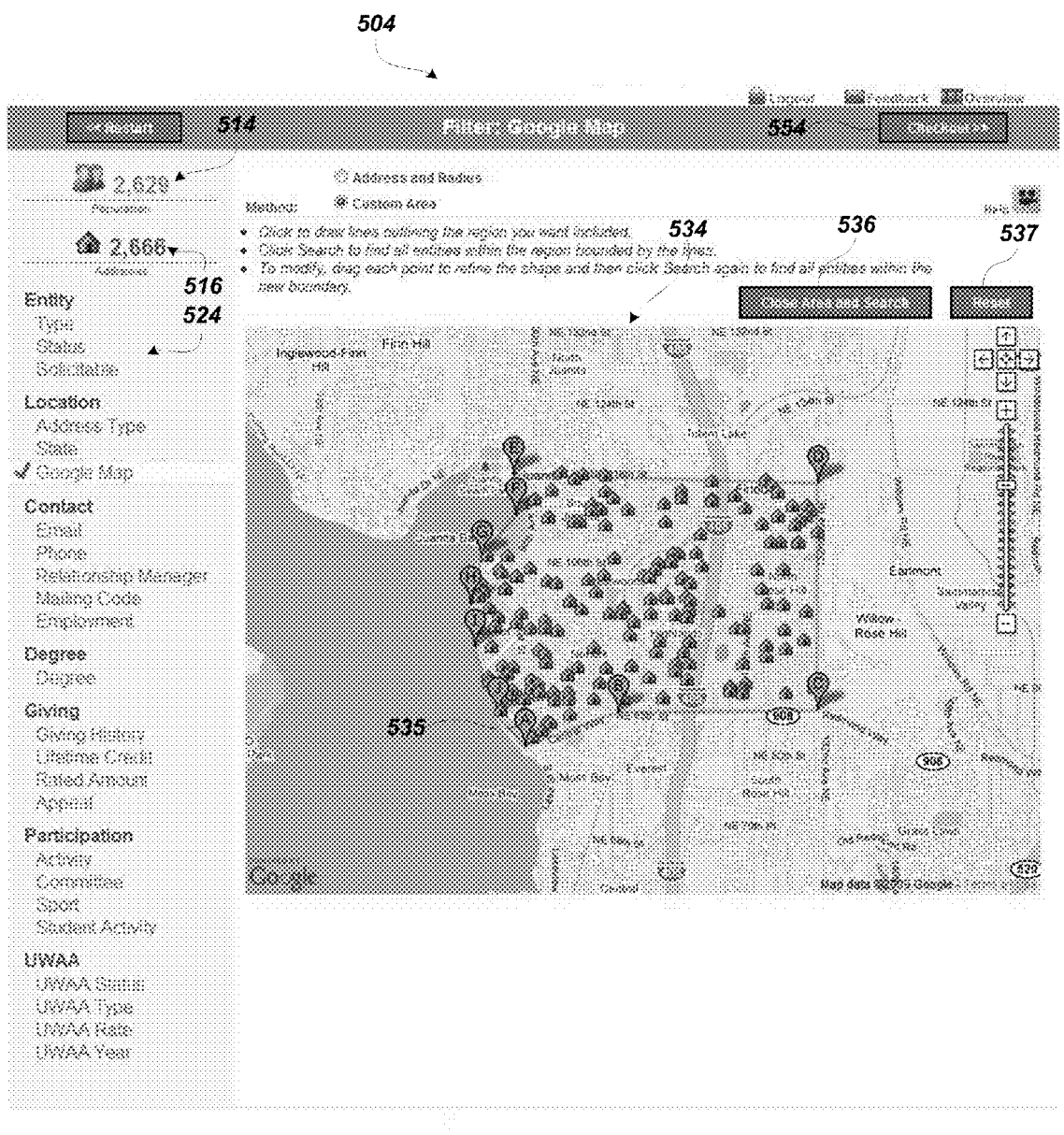

FIG. 5C is a screenshot of a map filtering selection screen 504 used to filter members from the master population. The map filtering selection screen 504 includes current population size 514, current attribute population size 516, a selection menu 524, a filter application 534, and a checkout button 554. The filter application 534 includes a search point 535, a search button 536, and a reset button 537.

Similar to the embodiments illustrated in FIGS. 5A and 5B, as a user selects filtering criteria, the current population size 514 is updated to reflect the number of members remaining in the current population after filtering criteria have been applied.

Also similar to the embodiments depicted in FIGS. 5A and 5B, attribute selection menu 524 includes a list of attribute categories. The list format of FIGS. 5A and 5B may be inefficient for displaying and/or narrowing certain categories of attributes, such as an address. For example, if the user wishes to filter population members based on those with addresses within a certain geographical area, it is inefficient to individually examine potentially thousands of addresses. Accordingly, in some embodiments, a map, such as a Google map, is displayed in filter application 534 when the user selects an attribute category, such as address, from attribute selection menu 524.

In some embodiments, the displayed map initially contains flags representing each of the available addresses. The user then establishes an enclosed area, such that addresses not contained within the enclosed area will be excluded from the population. In some embodiments, the enclosed area is established by the user selecting a search point 535 in as many locations as desired to establish the enclosed area. As shown in FIG. 5C, the user establishes search points "A" through "J" to establish the enclosed area. In some embodiments, rather than requiring the user to lastly click on precisely the same point as the first search point 535 to enclose the area, the user selects search button 536 to close the search area. The last search point is then connected to the initial search point 535 to enclose the area. For example, in FIG. 5C, the last search point "J" is connected with the initial search point "A" to enclose a search area on the map.

Current attribute population size 516 is then updated to include the number of addresses contained within the enclosed area and the current population size 514 is updated to include the number of current population members associated with an address contained within the enclosed area.

If the user makes a mistake and sets an undesired search point 535, or decides after enclosing an area that a different or no area should be enclosed, the user may select reset button 537 to have the search filter removed.

When the user is satisfied with the selection or exclusion of address attributes and the resulting current population size 514, the user pushes the checkout button 554 to receive a report of attributes associated with the remaining members in the current population, as described herein in reference to FIG. 5E.

Figure 5D:
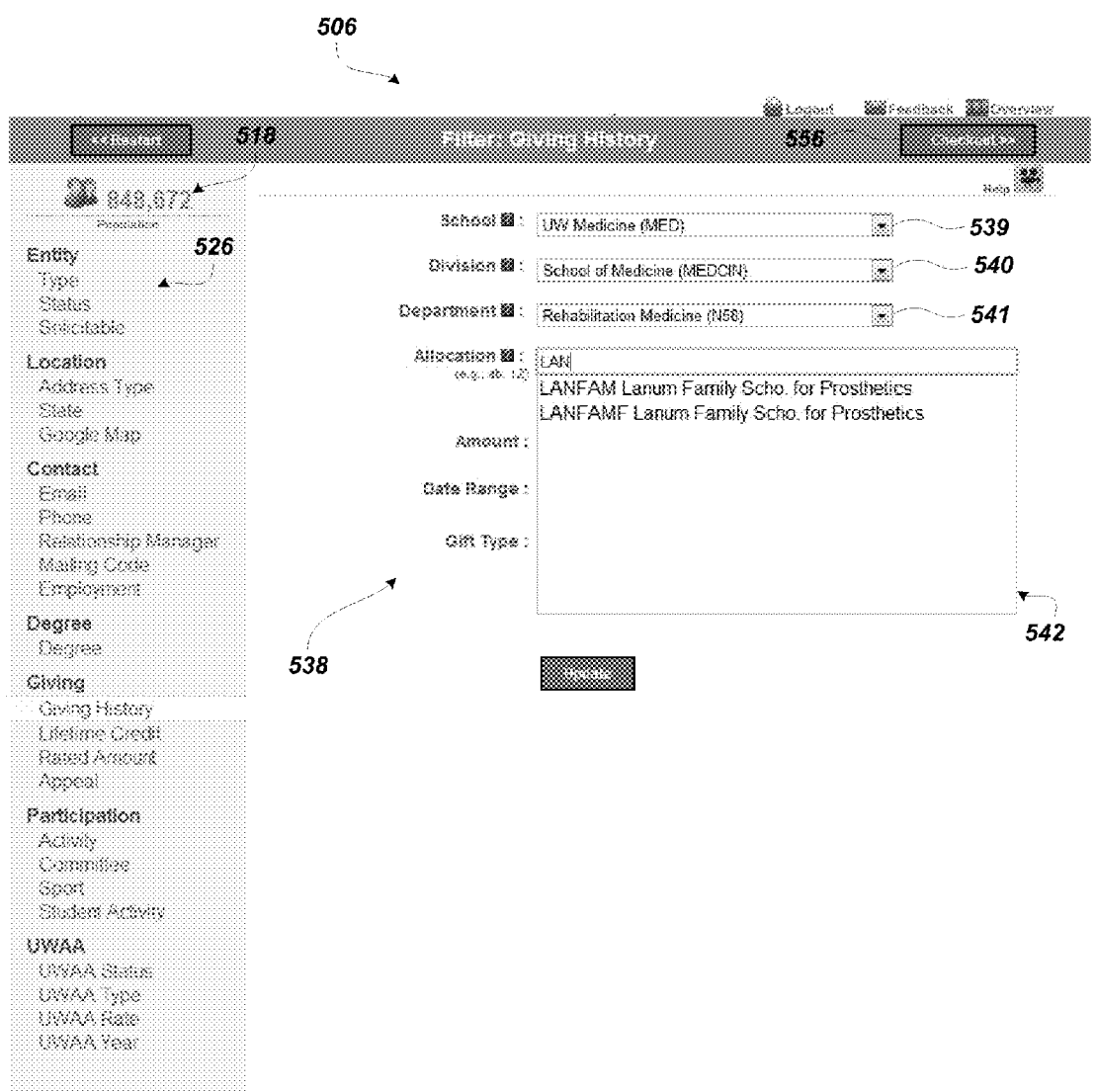

FIG. 5D is a screenshot of an advanced filtering selection screen 506 used to filter members from the master population. The advanced search screen 506 includes a current population size 518, a selection menu 526, a filter application 538, and a checkout button 556. Filter application 538 also includes one or more search fields 539.

Similar to the embodiments contained in FIGS. 5A-5C, as a user selects filtering criteria, the current population size 518 is updated to reflect the number of members remaining in the current population after filtering criteria have been selected.

Also similar to the embodiments contained in FIGS. 5A-5C, attribute selection menu 526 includes a list of attribute categories. There are certain filtering criteria, however, where displaying each attribute in list format is inefficient for purposes of narrowing the attributes to a certain range. For example, some attributes may have multiple tiers of sub-attributes. For instance, a user may wish to filter members based on those who have donated money to a certain school within a university, as shown by the "School" search field 539 in FIG. 5D. The desired school, however, may have many divisions, as shown by the "Division" search field 540. Further, a division in the school may have many departments, as shown by the "Department" search field 541. Further, a department may have many different allocations for donated money, as shown by the "Allocation" search field 542. It is inefficient to individually examine many schools at the same time, with potentially thousands of divisions, departments, and allocations. Hence, in some embodiments of the present technology, the user narrows a search of member giving history as illustrated by FIG. 5D.

When the user is satisfied with the filtered giving history details and the resulting current population size 518, the user selects checkout button 556 to receive a report of attributes associated with the current population members, as described herein in reference to FIG. 5E.

In some embodiments, when a user is satisfied with the filters that have been selected, the user is directed to a reporting screen 570. FIG. 5E is a screenshot of a reporting screen 570 used to select report criteria, such as which demographic information is received for the current population members. The reporting screen 570 includes preconfigured output groups 575 and specific output fields 580 for selection by a user. On reporting screen 570, the user selects which output fields they wish to have reported for each population member. The user may select as many or as few fields as desired. In addition, the user may return this screen later to adjust the selection of fields.

In many cases, users desire to view certain preset data about each population member. Accordingly, reporting screen 570 includes preconfigured output groups 575, where each group includes output fields commonly selected by users. For example, FIG. 5E depicts selection of a "Mailing (contact info only)" option. By selecting this preconfigured option, the system automatically selects appropriate output fields from specific output fields 580. However, the user may select additional fields or deselect checked fields as desired. Other preconfigured output groups 575 include "Event (detailed)," "Recognition," "Counts only," and "All fields." In other embodiments, other preconfigured output groups may be provided.

b. Reverse Schema Translation

FIG. 6 is a flow chart of an exemplary method 600 for translating one or more data source(s) into a reverse schema. First, at block 610, one or more data sources are loaded into dynamic memory. As described above, data sources may include database tables, spreadsheets, text files, and/or other data sources. In some embodiments, a single data source, such as a database table, may be used to generate a reverse schema. In other embodiments, multiple database tables and/or multiple different types of data sources may be combined to generate a reverse schema.

At block 620, unique identifiers are extracted and received from the data source(s). In some embodiments, each unique identifier comprises one or more unique alphanumeric characters associated with a database table, column, row and/or other data. In some embodiments, unique identifiers comprise primary keys from the data source(s), e.g., database tables. In other embodiments, each unique identifier comprises one or more unique alphanumeric characters otherwise associated with a data source and/or the data comprising the data source.

Next, at block 630, a master list of unique identifiers is generated. In some embodiments, the master list includes each unique identifier extracted from each data source. The master list may be normalized to put the list of unique identifiers in a uniform order. For example, in some embodiments, the master list is implemented using a hash table, where each entry in the hash table comprises a hash of a unique identifier. In some embodiments, the master list is implemented using a data structure for each list member that allows for efficient and dynamic growth of elements associated with a list member. For example, in some embodiments, the master list is implemented using a hash table where each entry in the hash table includes a hash of a unique identifier and a dictionary of filters, as discussed herein in reference to FIG. 9.

At block 640, arrays of attributes contained in each data source are identified. For example, in some embodiments, a column of data in a database table is identified as an array of attributes. The attributes within an array of attributes are characterized as members of an attribute category, such as sports. For example, each attribute in an array of sports attributes may be an individual sport, such as soccer, football, or hockey.

Next, at block 650, a data object is provided for each unique attribute in each common category of attributes. In some embodiments, the data object is implemented using a set, where a set identifier is the unique attribute. The set identifier is also referred to herein as a reverse access identifier; the two terms are used interchangeably. The data object implementation chosen is not critical to the disclosed technology and may vary according to the preference of one skilled in the art.

At block 660, the data object(s) are populated with unique identifiers associated with the unique attribute that is the data object's identifier. In some embodiments, as discussed in reference to block 650, the data object is implemented using a set, where a set identifier is the unique attribute and the data values of the set include the unique identifiers associated with the unique attribute.

Next, at block 665, if there are unprocessed data arrays remaining in the data source(s), the process returns to block 640. If all data arrays have been processed, the process continues to block 670.

At block 670, access is provided to the reverse schema for use by software or hardware applications. In some embodiments, data objects are grouped according to common category of the unique identifiers for reference convenience and data consistency.

Figure 7:
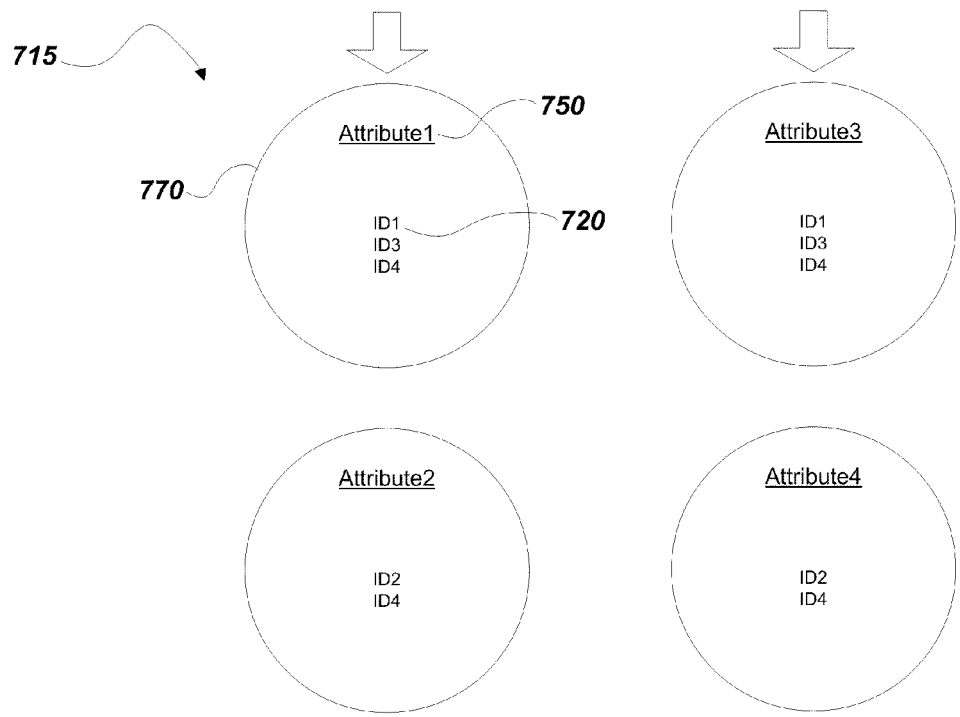

FIG. 7 illustrates an exemplary reverse schema translation 700. FIG. 7 depicts a data source 710 and a reverse schema 715. The data source 710 includes unique identifiers 720 and a data array 730. Data array 730 includes common category identifiers 740 and unique attributes 750. Reverse schema 715 includes data objects 770. A data object 770 includes a unique attribute 750 and unique identifiers 720.

Reverse schema translation 700 illustrates embodiments of the disclosed technology using a database table as data source 710. In other embodiments, as described in additional detail herein, data source 710 may be a spreadsheet, a text file, and/or other data source(s). As illustrated in FIG. 7, data source 710 is translated into reverse schema 715.

In data source 710, a common category is associated with unique attributes 750. Each common category includes a common category identifier 740. The common category may have as few as zero unique attributes 750 associated with it, but there is no upper limit of associated attributes 750. For example, as described above, a sports category may be associated different sports as attributes, such as soccer, football, or hockey. Each unique attribute 750 is further associated with at least one unique identifier 720. A unique identifier 720 may have zero or more unique attributes 750 associated with it.

Reverse schema translation 700 proceeds according to common categories of unique attributes 750. Each unique attribute 750 is extracted from the common category. A data object 770 is provided for each unique attribute 750. Unique identifiers 720 that are associated with the unique attribute 750 are identified. The data object is then populated by the unique identifiers 720 that are associated with the unique attribute 750. There may be as few as one unique identifier 720 associated with the unique attribute 750. In addition, a unique identifier 720 may be included in multiple data objects 770, as illustrated in FIG. 7.

For example, as depicted in FIG. 7, Attribute 1 is extracted from the common category corresponding to Column 1. The unique identifiers associated with Attribute 1—ID1, ID3, and ID4—are added to a data object corresponding to Attribute 1.

In some embodiments, the data object 770 is a data structure that may expand and be searched efficiently. Thus, in some embodiments, the data object 770 is implemented using a set, where unique identifiers 720 are easily and efficiently added and searched.

Once the data object 770 for each unique attribute 750 is populated with unique identifiers 720, each data object 770 is associated with the common category with which the unique attribute 750 is associated. For example, as depicted in FIG. 7, the data object corresponding to Attribute 1 is associated with the common category corresponding to Column 1.

Figure 8:
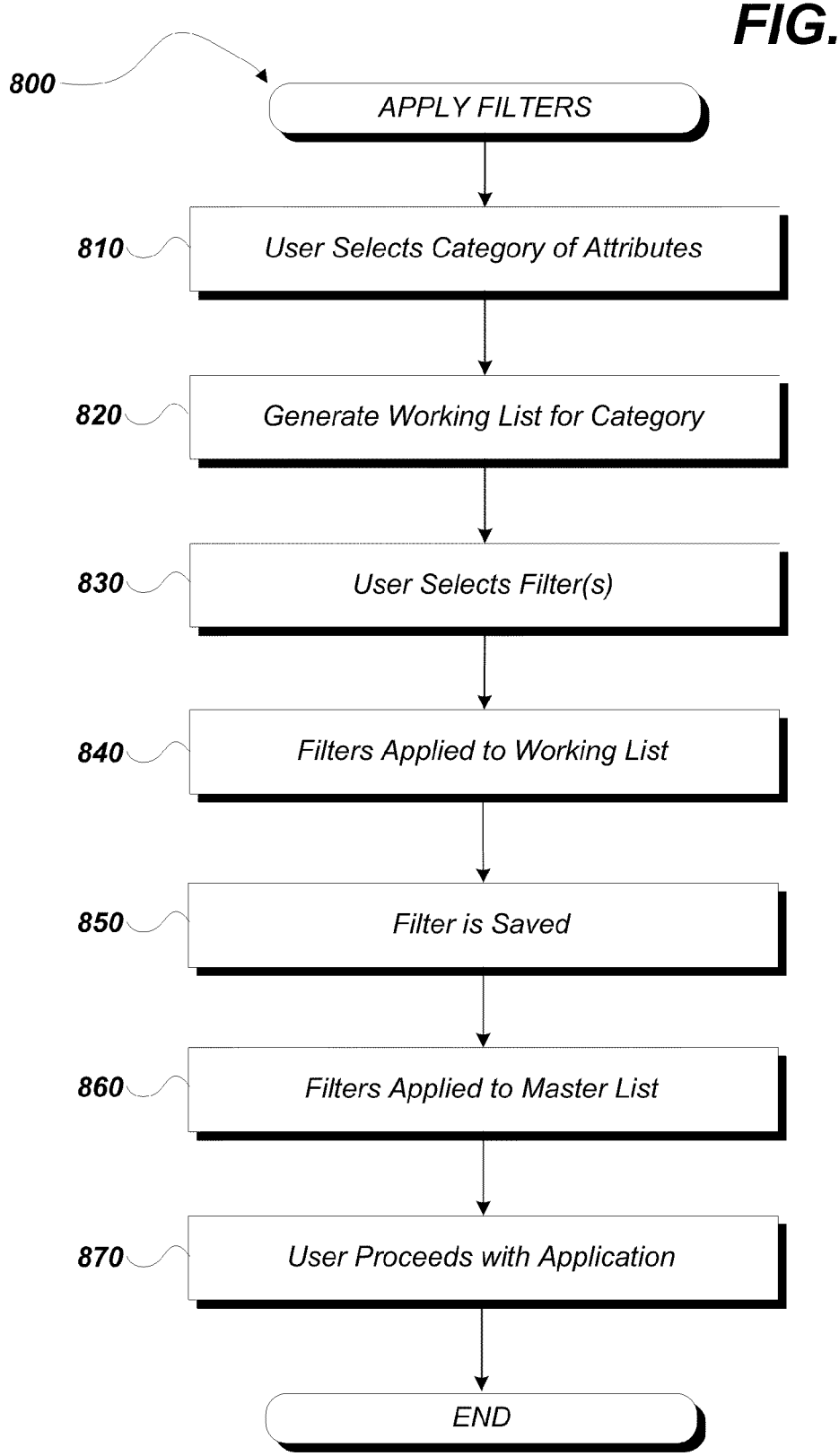

Once the master list of unique identifiers has been created, filters may be applied to the master list in order to filter the population in accordance with the techniques described herein. FIG. 8 is a flow chart of an exemplary method 800 for applying filters. First, at block 810, the user selects a category of attributes. Examples of categories of attributes are depicted in the attribute selection menu 520 of FIG. 5A, and include entity type, address, contact information, giving history, activity, and/or other attribute categories.

Next, at block 820, a working list is generated for use in association with the selected attribute category. The working list is a temporary copy of the master list.

At block 830, the user selects a filter. Examples of filters and the filter selection process are described herein in accordance with FIGS. 5A-5D. For example, as described above, the user may select a "faculty" filter in order to exclude faculty members from the current population.

Next, at block 840, the filter chosen by the user is applied to the working list. Each data object associated with a unique attribute that is to be filtered out (e.g., faculty) is ignored, and each data object associated with a unique attribute that is not to be filtered out (e.g., data objects not associated with a faculty attribute) is processed. In this processing, a flag is applied to unique identifiers in the working list corresponding to the unique identifier(s) contained in data objects associated with the unique identifiers not filtered. When the processing is complete, each unique attribute in the working list that was not associated with an attribute filtered by the user has a flag associated it. For example, if the user selects the "faculty" filter, all unique attributes in the working list that are not associated with a faculty attribute will have corresponding flags.

In some embodiments, a unique identifier is associated with both a filtered and a non-filtered attribute. As a result, the unique identifier in the working list that is associated with an attribute filtered by the user will have a flag associated with it, in spite of the filter chosen by the user, because the unique identifier in the working list is also associated with an attribute not filtered by the user. For example, an individual may be both a faculty member and an alumnus. The unique identifier associated with the individual will have a flag associated with it, because alumnus is not a filtered attribute (even though faculty is).

Next, at block 850, the filter chosen by the user is saved. When saving the filter, a reference is generated that identifies the filter. The location and method of saving the filter is not critical to the disclosed technology.

Next, at block 860, the selected filter(s) are applied to the master list. Each unique identifier in the master list that does not have an associated flag in the working list is assigned a flag that includes a reference to the saved filter. In some embodiments, this flag is added to the set of the corresponding data element in the master list. The process of applying flags to the master list is also referred to herein as blacklisting. Members of the master list that have been blacklisted are not included in the current population size displayed to the user, nor are they included in any generated report on the current population. That is, members displayed in the current population size and/or included in a report are non-blacklisted unique identifiers.

At block 870, the user proceeds with the application. In some embodiments, the master list size is updated according to the non-flagged elements in the master list. Thus, the elements in the master list that are not flagged are considered members of the current list and part of the current population. This current list size is displayed to the user. The user may then continue with the application and select other filters, remove a selected filter, proceed to generate a final report, and/or conclude use of the application.

Figure 9:
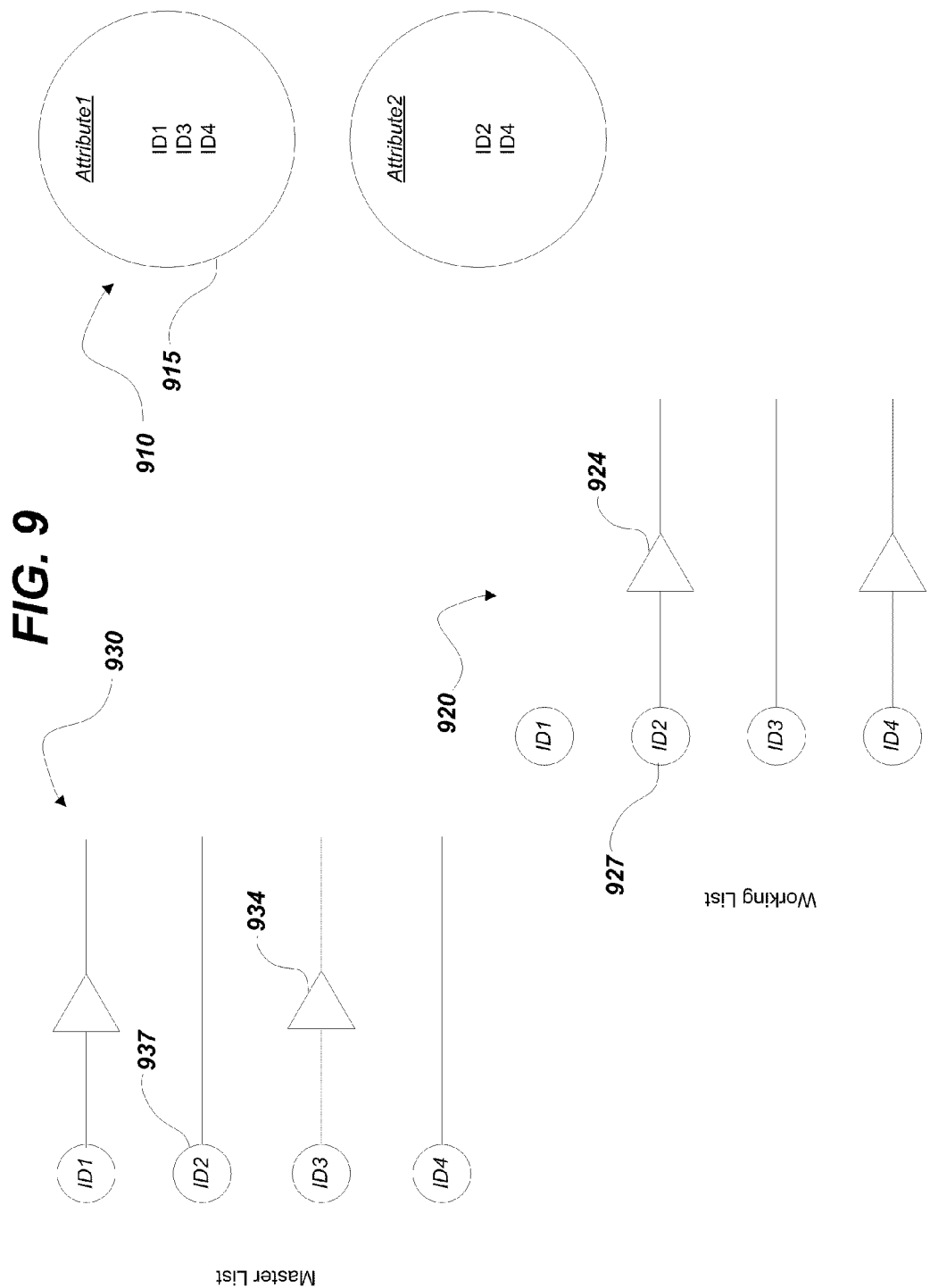

FIG. 9 is a block diagram illustrating the use of filters, as described herein in accordance with the method of FIG. 8. FIG. 9 includes a reverse schema 910, a working list 920, and a master list 930. The reverse schema 910 includes a data object 915. The working list 920 includes a working flag 924 and a working unique identifier 927. The master list 930 includes a master flag 934 and a master unique identifier 937.

In operation, a user selects a filter, as described above in accordance with FIGS. 5A-5D. The data object 915 associated with the unique attribute filtered by the user is ignored. Data objects associated with non-filtered unique attributes, however, are processed. In the embodiment illustrated in FIG. 9, the user selects a filter that filters out Attribute 1, which is represented by data object 915. The filter is then processed by examining each data object that is not associated with Attribute 1.

Working flag 924 is applied to the relevant working unique identifiers 927 in working list 920. In the example illustrated by FIG. 9, Attribute 2 is the only other unique attribute present. Therefore, the data object associated with Attribute 2 is processed. The unique identifiers contained within the data object associated with Attribute 2 are extracted. Then working flag 924 is associated with each working unique identifier 927 corresponding to each extracted unique identifier. In this manner, each working unique identifier 927 corresponding to a unique identifier contained within a data object associated with a unique attribute that is not filtered by the user has working flag 924 associated with it. The results of this process are illustrated by working list 920, which has working flags corresponding to ID2 and ID4, which are each associated with Attribute 2.

After working flag 924 is applied to working unique identifiers 927 in working list 920, master flag 934 is applied to the appropriate master unique identifiers 937 of master list 930. Each working unique identifier 927 of working list 920 that is not associated with working flag 924 is identified. The master unique identifiers 937 corresponding to the identified working unique identifiers 927 are then associated with master flag 934. In this manner, master flag 934 is associated with master unique identifiers 937 not corresponding to working unique identifiers 927 that have working flags 924 associated with them. The results of this process are illustrated in master list 930.

In some embodiments, the filter selected by the user is stored, and working flag 924 and master flag 934 include references to the saved filter, as described herein in reference to FIG. 8.

In some embodiments, the attributes contained in the working list 920 contain unique identifiers that exist do not in the master list 930. For example, in one embodiment, the master list 930 contains unique identifiers 937 that are associated with individuals' social security numbers. However, the unique identifiers contained within the data structures of the reverse schema 910 may be unique identifiers extracted from a database table that is a secondary to a database table that contained the social security numbers. Thus, the table containing the social security numbers exists in a 1 to n relationship with the secondary table in relational database schema. In other embodiments, the data sources are data structures other than relational databases.

In some embodiments, to translate filters applied to working unique identifiers 927 in working list 920 to filters applied to master unique identifiers 937 in working list 930, a relational data structure (not shown) is utilized. The relational data structure maintains a list of master unique identifiers and their corresponding unique identifiers in the reverse schema 910. In this manner, filters applied to working unique identifiers not contained in the master list may be applied to the correct master unique identifier in the master list by extracting the working unique identifier from the relational data structure and associating the filter with the master unique identifier related to the working unique identifier.

Figure 10:
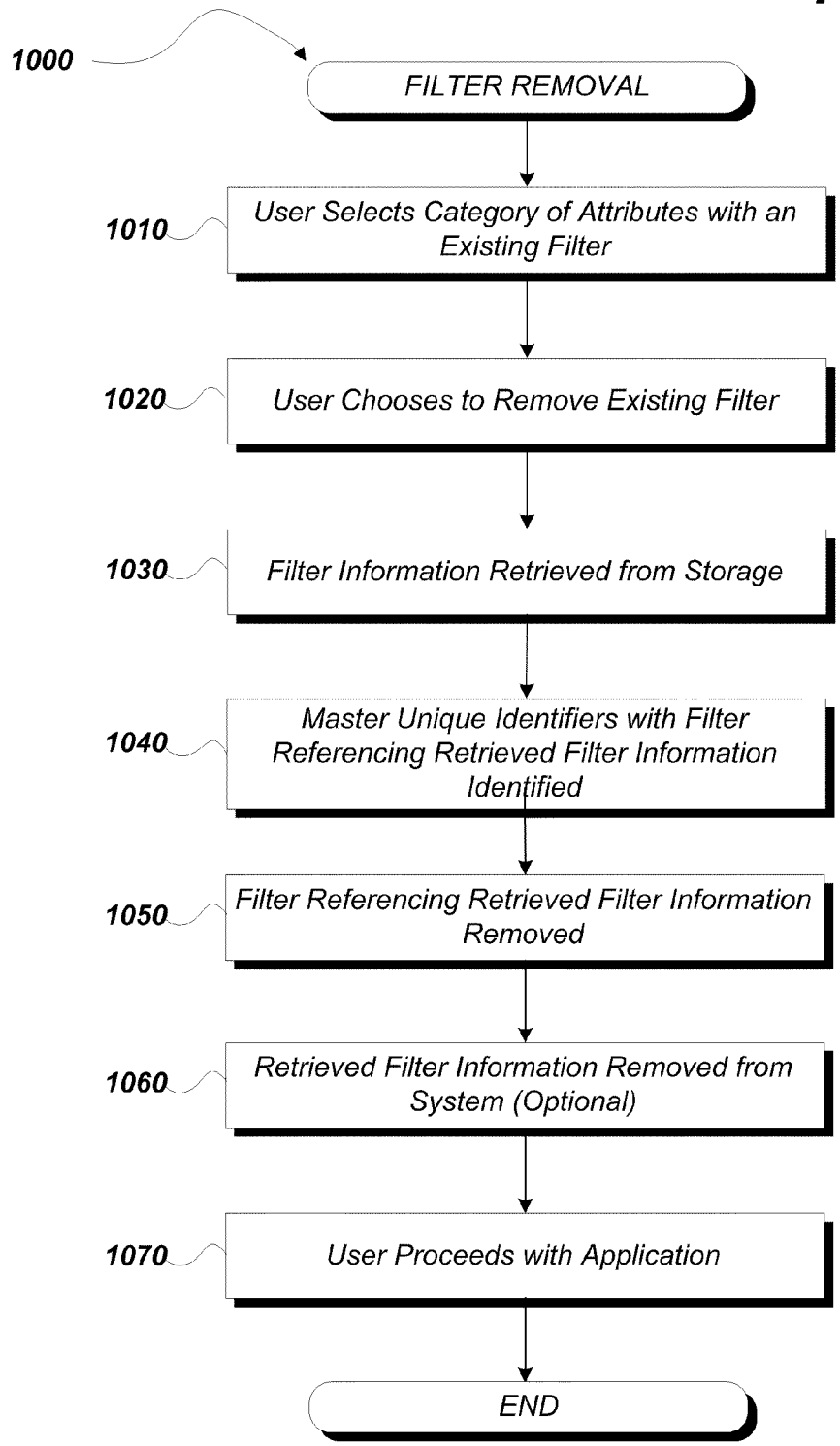

As described in additional detail herein, including in accordance with FIG. 4, a user may remove a filter from application to the current population. FIG. 10 is a flow chart illustrating an exemplary method 1000 for removing a filter from the master list in accordance with the techniques described herein. First, at block 1010, a user selects a category of attributes for which an existing filter has been applied.

Next, at block 1020, the user selects to remove the existing filter. In some embodiments, the user removes an existing filter by selecting a "Remove Filter" button. Alternatively or additionally, the user may remove an existing filter by deselecting a previously selected bar of filter application 530, such as illustrated in FIG. 5A.

At block 1030, the filter information associated with the filter selected by the user is retrieved from storage.

Next, at block 1040, master unique identifiers associated with a flag referencing the retrieved filter information are identified in a master list. In some embodiments, each unique identifier in the master list is examined to determine whether it has a flag associated with it that references the retrieved filter information.

At block 1050, the flags associated with the identified unique identifiers in the master list are removed. Next, in block 1060, the retrieved filter information is optionally removed from the system. In other embodiments, however, the retrieved filter information may not be removed, but instead may remain stored on the system. The option to reinstate the filter may be presented to the user when the user selects the corresponding category of attributes.

Next, at block 1070, the user proceeds with the application.

3. Conclusion

From the foregoing, it will be appreciated that specific embodiments of the technology have been described herein for purposes of illustration, but that various modifications may be made without deviating from the spirit and scope of the described technology. For example, the data structures used by the system may differ from the data structures described herein, in that they, for example, may be organized in a different manner, may contain more or less information than shown, may be compressed and/or encrypted, and may be optimized in a variety of ways. Those skilled in the art will further appreciate that the depicted flow charts may be altered in a variety of ways. For example, the order of the steps may be rearranged, steps may be performed in parallel, steps may be omitted, or other steps may be included. Accordingly, the technology described herein is not limited except as by the appended claims.

We claim:

1. A method, in a computing system having a processor, for providing data from a data source, the method comprising:
   receiving a master list comprising a plurality of unique identifiers associated with the data source, wherein the data source includes one or more attribute arrays;
   identifying, by the processor, an attribute array of the data source, the attribute array containing a plurality of attributes;
   translating, by the processor, the data source into a reverse schema, wherein the translating comprises assembling a data object that includes:
      a reverse access identifier, wherein the reverse access identifier is an attribute selected from the plurality of attributes, and
      a set of unique identifiers selected from the plurality of unique identifiers, wherein each unique identifier in the set of unique identifiers is associated with the reverse access identifier;
   receiving a selection of the reverse access identifier;
   generating, by the processor, a working list of unique identifiers, wherein the working list includes the plurality of unique identifiers associated with the data source;
   flagging each unique identifier in the working list that is not associated with the data object corresponding to the selected reverse access identifier;
   blacklisting each unique identifier in the master list that is not flagged in the working list; and
   providing data associated with non-blacklisted unique identifiers for display.

2. The method of claim 1, wherein the receiving the selection of the reverse access identifier comprises receiving a selection of a graph bar, icon, graphic, or text associated with the reverse access identifier.

3. The method of claim 1, wherein a reference to the selected reverse access identifier is stored for subsequently providing data associated with an updated data source.

4. The method of claim 1, wherein the data associated with the non-blacklisted unique identifiers comprises a population size.

5. The method of claim 1, wherein receiving the plurality of unique identifiers comprises loading the entire data source into a dynamic memory of the computing system.

6. The method of claim 1, wherein receiving the plurality of unique identifiers from the data source comprises receiving the plurality of unique identifiers from multiple distinct data sources.

7. The method of claim 1, wherein translating the data source into the reverse schema further comprises:
   identifying a second attribute array of the data source, the second attribute array containing a second plurality of attributes;
   assembling a second data object, the second data object including:
      a second reverse access identifier, wherein the second reverse access identifier is an attribute selected from the second plurality of attributes, and
      a second set of unique identifiers selected from the plurality of unique identifiers, wherein each unique identifier in the second set of unique identifiers is associated with the second reverse access identifier, and wherein the set of unique identifiers and the second set of unique identifiers do not have unique attributes in common.

8. The method of claim 2 wherein the flagging of each unique identifier in the working list that is not associated with the data object corresponding to the selected reverse access identifier comprises flagging each unique identifier in the working list that is not associated with the data object corresponding to the selected reverse access identifier with a working flag.

9. The method of claim 8 wherein the blacklisting comprises flagging each unique identifier in the master list that is not flagged in the working list with a master flag.

10. The method of claim 9, wherein each master flag includes a reference to the selected reverse access identifier.

11. A computing system for providing data from a data source, the computing system comprising:

a processor;
a memory;
a reverse schema module implemented as instructions stored in memory and executed by the processor, the reverse schema module configured to:
  receive a master list comprising one or more unique identifiers from the data source,
  identify an attribute array of the data source, the attribute array containing a plurality of attributes, and
  translate the data source into a reverse schema at least in part by assembling a data object, wherein the data object includes:
    a reverse access attribute, wherein the reverse access attribute is an attribute selected from the plurality of attributes, and
    at least one unique identifier selected from the one or more unique identifiers, wherein the at least one unique identifier is associated with the reverse access attribute;
receive a selection of the reverse access attribute;
generate a working list of unique identifiers, wherein the working list includes the one or more unique identifiers associated with the data source;
mark each unique identifier in the working list that is not associated with the data object corresponding to the selected reverse access attribute;
exclude each unique identifier of the master list that is not marked in the working list; and
provide data associated with non-excluded unique identifiers for display.

12. The system of claim 11, wherein a reference to the selected reverse access attribute is stored in the memory for subsequently providing data associated with an updated data source.

13. The system of claim 11, wherein a reference to the selected reverse access attribute is stored in the memory for subsequently deselecting the selected reverse access attribute.

14. The system of claim 11, wherein the data associated with the non-excluded unique identifiers comprises a population size.

15. The system of claim 11, wherein the reverse schema module is further configured to generate a report including the data associated with the non-excluded unique identifiers.

16. A physical computer-readable storage medium having stored thereon computer-executable instructions, the instructions comprising:
  instructions for receiving a master list comprising a plurality of unique identifiers associated with the data source, wherein the data source includes one or more attribute arrays;
  instructions for identifying an attribute array of the data source, the attribute array containing a plurality of attributes;
  instructions for translating the data source into a reverse schema, wherein the instructions for translating comprise instructions for assembling a data object that includes:
    a reverse access identifier, wherein the reverse access identifier is an attribute selected from the plurality of attributes, and
    a set of unique identifiers selected from the plurality of unique identifiers,
      wherein each unique identifier in the set of unique identifiers is associated with the reverse access identifier;
  instructions for receiving a selection of the reverse access identifier;
  instructions for generating a working list of unique identifiers, wherein the working list includes the plurality of unique identifiers associated with the data source;
  instructions for flagging each unique identifier in the working list that is not associated with the data object corresponding to the selected reverse access identifier;
  instructions for blacklisting each unique identifier in the master list that is not flagged in the working list; and
  instructions for providing data associated with non-blacklisted unique identifiers for display.

17. The physical computer-readable storage medium of claim 16, wherein the instructions further comprise instructions for storing a reference to the selected reverse access attribute.

18. The physical computer-readable storage medium of claim 16, wherein the data associated with the non-blacklisted unique identifiers comprises a population size.

19. The physical computer-readable storage medium of claim 16, wherein the instructions further comprise instructions for generating a report including the data associated with the non-blacklisted unique identifiers.

20. The physical computer-readable storage medium of claim 16, wherein the instructions further comprise:
  instructions for identifying a second group of data from the data source, the second group of data comprising a second plurality of attributes associated with a second common attribute category; and
  instructions for generating a second data element, the second data element comprising:
    a second reverse access attribute, wherein the second reverse access attribute is one of the plurality of attributes, and
    a second unique identifier selected from the plurality of unique identifiers, wherein the second unique identifier is associated with the second reverse access attribute, and wherein the second unique identifier is different than the unique identifier.

* * * * *